(12) United States Patent
Takeshita et al.

(10) Patent No.: US 6,509,969 B1
(45) Date of Patent: Jan. 21, 2003

(54) SYSTEM FOR INSPECTING AND/OR PROCESSING A SAMPLE

(75) Inventors: Shinpei Takeshita, Gyoda (JP); Jurgen Frosien, Riemerling (DE)

(73) Assignee: Advantest Corp., Tokyo (JP)

(*) Notice: Subject to any disclaimer, the term of this patent is extended or adjusted under 35 U.S.C. 154(b) by 211 days.

(21) Appl. No.: 09/637,393

(22) Filed: Aug. 11, 2000

(30) Foreign Application Priority Data

Aug. 16, 1999 (EP) .............................. 99116065

(51) Int. Cl.[7] .............................................. G01B 11/00
(52) U.S. Cl. ...................... 356/399; 356/614; 356/622; 250/234; 250/235
(58) Field of Search .................. 356/399, 614, 356/622; 250/234, 235

(56) References Cited

U.S. PATENT DOCUMENTS 3,936,716 A  2/1976  Bos 5,557,156 A * 9/1996 Elings .......................... 250/306

FOREIGN PATENT DOCUMENTS

EP   0 559 402 A2   9/1993

* cited by examiner

*Primary Examiner*—Frank G. Font
*Assistant Examiner*—Roy M. Punnoose

(57) ABSTRACT

A system for inspecting and/or processing a sample on a stage with a probe or imaging apparatus, the probe or imaging apparatus is defined by an optical column having beam generating means and means to deflect the beam, the position of the stage relatively to the probe or imaging apparatus being controlled by position control means. The position control means comprises gyroscopic means fixed to the stage and/or the probe or imaging apparatus and is operatively connected with the deflection means in order to compensate unintentional movements of the stage relatively to the column.

7 Claims, 2 Drawing Sheets

Fig. 3
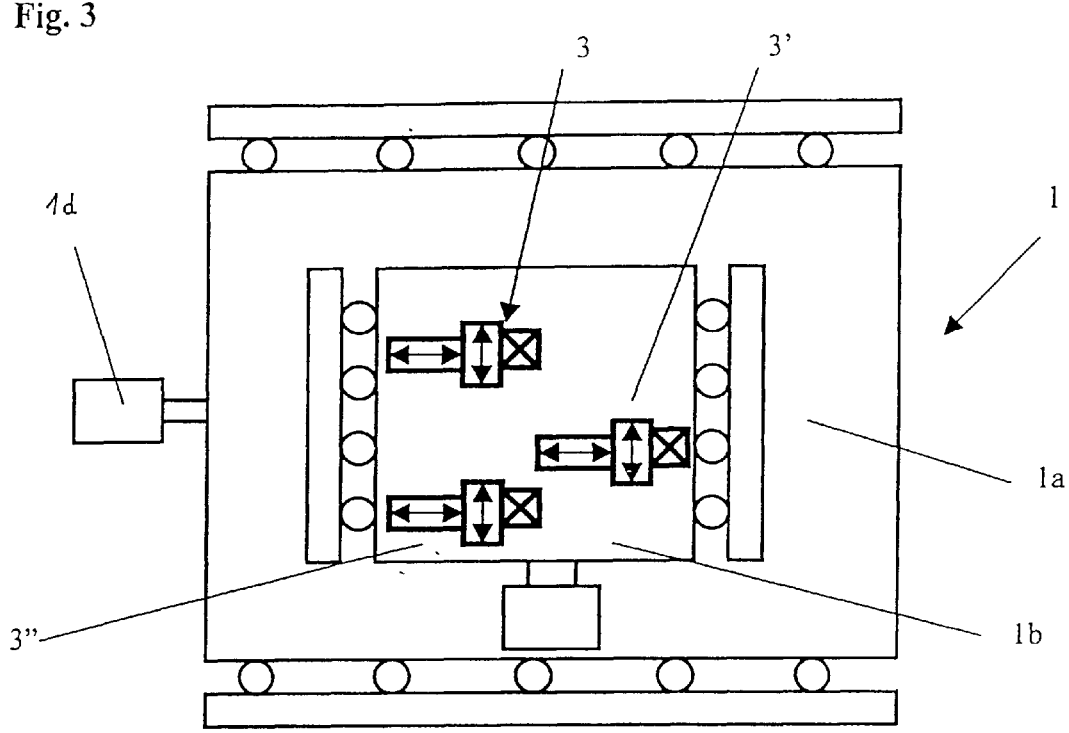
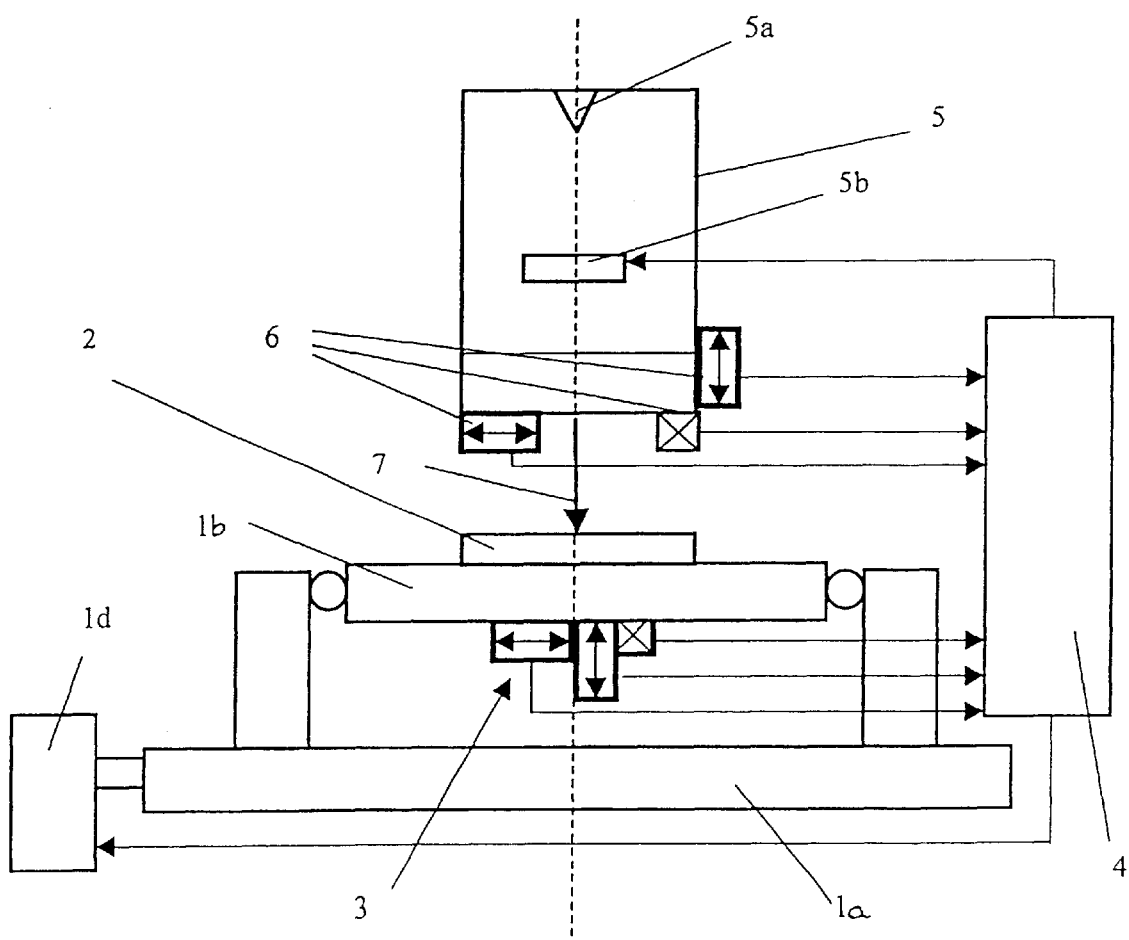
Fig. 4

SYSTEM FOR INSPECTING AND/OR PROCESSING A SAMPLE

FIELD OF THE INVENTION

The invention relates to a system for inspecting and/or processing a sample on a stage with a probe or imaging apparatus.

BACKGROUND OF THE INVENTION

High resolution lithography and micro-machining tools (e.g. E-beam lithography system, DUV-stepper), inspection and process-control equipment (e.g. CD-SEM, defect location and defect review tools) and analytical and test equipment (SEM, FIB, AFM, high resolution tools using UV, DUV, and EUV light sources) require stages for carrying and moving the sample to be inspected and/or processed.

With increasing resolution requirements of those systems, the demands on these stages with respect to stability and position accuracy are steadily increasing. Accuracy and stability requirements are below 100 nanometer and will probably go down below 1 nanometer. The mechanical design and mechanics of the stage no longer can fulfill the challenging demand alone. Therefore, it is necessary to apply position control means to support the stage position accuracy and stage stability.

Stage position control is performed mainly by two tools, by a linear optical encoder and by a laser-interferometer. A linear encoder consists of optical grids or gratings which are connected to the stage and whose motion is read by suitable optical sensors, which are placed on the non-moveable part of the stage setup. The laser-interferometer control uses the interference between a reflected beam, which is generated by a mirror connected with the stage, and a reference beam. Since the wavelength of the laser beam is used as a measurement unit, laser interferometers offer a much better position accuracy (in the range of 10 nm) than optical encoders which have an accuracy in the range of 100 nm.

Linear encoders have the drawback that their accuracy is limited. Laser-interferometers are much more accurate, but they are very complex and expensive. The accuracy is limited by changes in the refractive index of the optical light path and the quality of the mirrors. Furthermore, laser-interferometers are used preferably for x-y-coordinate measurements. Setups for a 3-dimensional coordinate measurement of stage position is very difficult to realize.

From EP-A-0 559 402 and U.S. Pat. No. 3,936,716 stabilization systems are known for stabilizing a platform with gyroscopic means.

SUMMARY OF THE INVENTION

It is an object of the invention to provide a system for inspecting and/or processing a sample on a stage with a probe or imaging apparatus with a precise, simple and cost-effective position control means.

It is a further object of the invention to provide means which allows both the accurate control of the position of the stage relatively to the probe or imaging apparatus and the mechanical detection and stabilization of mechanical disturbances (e.g. vibrations, drift).

The position control means can be preferably used in probe systems (particle beam systems, atomic force microscopes, high resolution tools).

The gyroscopic means is adapted to measure movements in one, two or three dimensions.

In a preferred embodiment, there is at least one motor for moving the stage and/or the probe or imaging apparatus which is operatively connected with the position control means.

The system for inspecting and/or processing a sample according to a preferred embodiment comprises a probe or imaging apparatus. The probe and/or imaging apparatus according to the disclosed embodiment is defined by a scanning probe or a column with beam generating means and means to deflect the beam. In case of a column, the column is equipped with column gyroscopic means to detect movements of the optical column. Furthermore, the control means is operatively connected with the deflection means in order to compensate uncontrolled movements (vibrations, drift) of the stage relatively to the column.

In another system for inspecting and/or processing a sample, the probe or imaging apparatus is defined by an optical column having beam generating means, means to deflect the beam and image generating means wherein the control means is operatively connected with the image generating means in which the unintentional movements of stage relative to the column will be taken into account when processing the image.

BRIEF DESCRIPTION OF THE DRAWINGS

Further embodiments and advantages of the invention will be described in more detail below with reference to the drawings, in which;

FIG. 3 shows a schematic representation of the moveable stage according to a second embodiment, and FIG. 4 shows a schematic representation of the apparatus with an optical column.

DETAILED DESCRIPTION OF THE INVENTION

The embodiments described below have a moveable stage. However, it is also possible to move the probe or imaging apparatus (i.e. the column). In such a case, the gyroscopic means is fixed at least to the probe or imaging apparatus.

Figure 1:
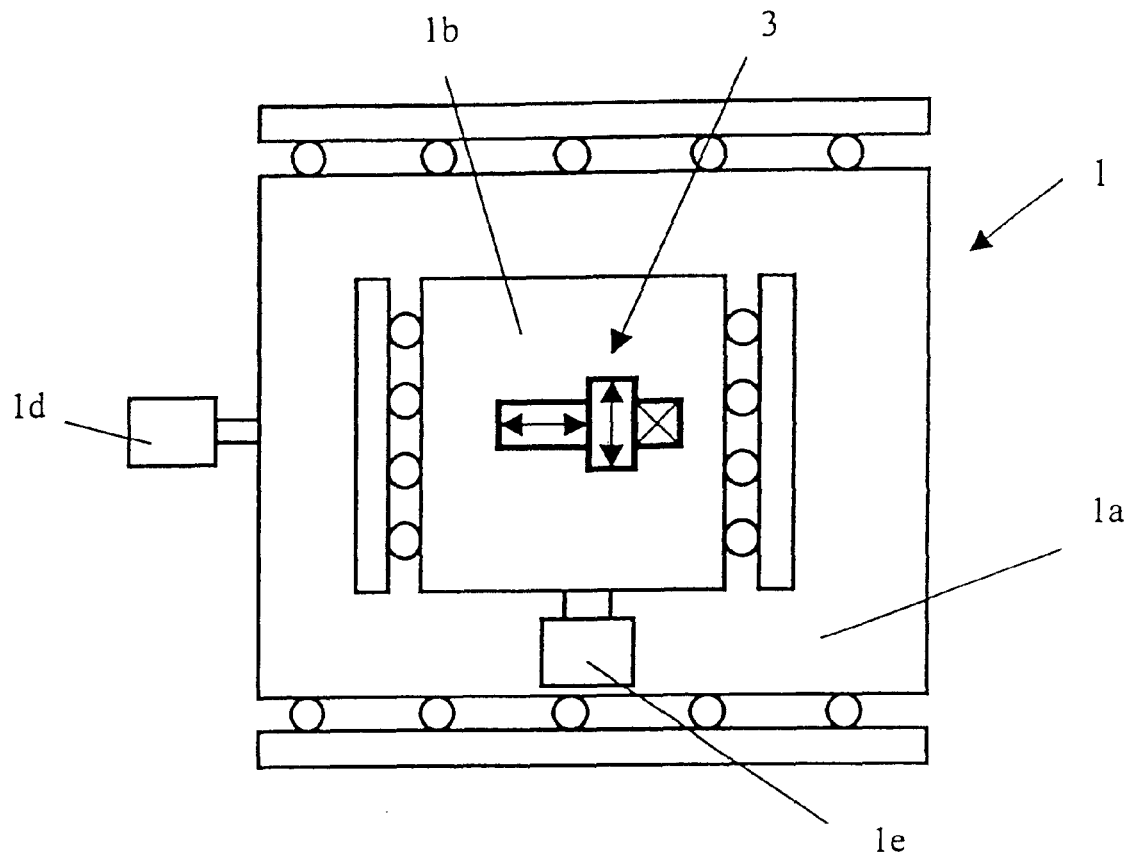
FIG. 1 shows a schematic representation of the moveable stage.
Figure 2:
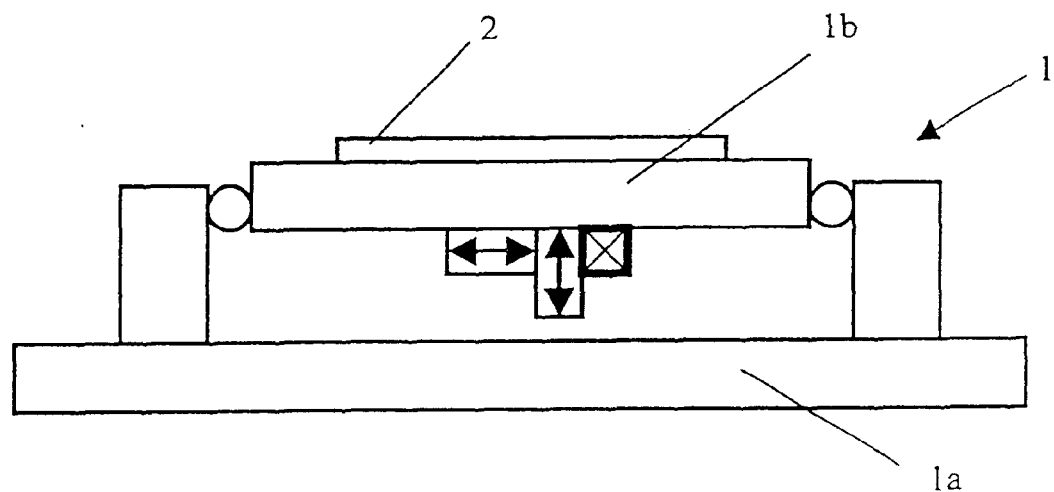
FIG. 2 shows a schematic side view of the moveable stage of FIG. 1.

FIGS. 1 and 2 show a stage 1 with a base plate 1a and a sample plate 1b. A sample 2 to be inspected is mounted on the sample plate 1b. The stage is moveable in x- and y-direction with a first motor 1d and a second motor 1e. A third motor for the z-direction may be provided. Such a moveable stage is known in the art.

There is stage gyroscopic means 3 fixed to the moveable stage 1. The gyroscopic means is mounted preferably to the backside of the sample plate 1b.

The gyroscopic means is able to detect and measure motions with high spatial and temporal resolution. Recent developments in micro-electro-mechanical technology promise to significantly reduce the size, weight and cost of these sensors. There already exist tunneling-based gyroscopes that employ the high displacement sensitivity of quantum tunneling to obtain the desired resolution.

The gyroscopic means 3 is adapted to measure movements of the stage 1 in one, two or three dimensions. This can be realized by using gyroscopic elements which are sensitive in all desired directions or by using a gyroscopic element for one or two dimensions to be measured. Usually, the gyroscopic means will control at least the directions of movement which can be performed by the motors of the stage. However, even if the stage is merely moveable in x- and y-directions, it may be preferred to also detect uncontrolled movements in the third direction (z-direction).

FIG. 3 shows a second embodiment having gyroscopic means 3, 3' and 3" mounted at different locations on the moveable stage 1b. With such an arrangement, three independent locations can be measured and accordingly, the position of every point on the stage can be determined with very high accuracy. Effects and measurement errors caused by lost motion (rotation of the stage around undefined axes) can be eliminated with such an arrangement. Of course, it is also possible to use two or more than three independent gyroscopic elements for measuring the same directions. With three gyroscopes for each dimension, it is possible to determine the three-dimensional position of each point of the stage or apparatus.

The system for inspecting and/or processing a sample according to FIG. 4 further comprises a position control means which receives the output signals of the stage gyroscopic means 3. The control means 4 is operatively connected with the motors 1d and 1e of the stage. Accordingly, it will be possible to move the stage very precisely and also to compensate uncontrolled movements which occur for example due to vibrations or drifts.

The system for inspecting and/or processing a sample further comprises a probe or imaging apparatus. In the disclosed embodiment, this apparatus is defined by an observation tool or optical column 5 which normally uses a beam (light, e-beam, ion-beam) or a probe. In order to measure the stage position relatively to the optical column, there are column gyroscopic means fixed to the optical column 5. By evaluating the output signals of the stage gyroscopic means 3 and the column gyroscopic means via control means 4 it will be possible to determine the relative position of the stage 1 to the optical column 5. The column gyroscopic meansare also adapted to measure motions in one, two or three dimensions.

Accordingly it is possible to measure and control tilt and/or rotational movements of the stage and/or the probe or imaging apparatus.

The optical column 5 disclosed in FIG. 4 further comprises means 5a for generating a beam 7 (e.g. light beam, particle beam) and deflections means 5b for deflecting the beam 7.

In order to compensate mechanical vibrations and drift, which introduce disturbances in the system and cause distortions and resolution losses, a feedback loop is proposed. The control means 4 receives the output signals of the stage and/or column gyroscopic means 3, and generates correction signals which are proportional to the time dependent movements of the stage 1 relatively to the optical column 5. After amplification and calibration, these signals are supplied to the deflection means 5b to compensate the interference effects of vibration or drift.

In another embodiment, the control means 4 are operatively connected with image generating means of the probe or imaging apparatus, wherein the unintentional movements of the stage relatively to the column will be taken into account when processing the image.

What is claimed is:

1. A system for inspecting and/or processing a sample on a stage, comprising:

a probe or imaging apparatus defined by an optical column having beam generating means and means to deflect the beam; and position control means for controlling a position of the stage relatively to the probe or imaging apparatus;

wherein the position control means comprises gyroscopic means fixed to the stage and/or the probe or imaging apparatus and is operatively connected with the deflection means in order to compensate unintentional movements of the stage relatively to the column.

2. A system according to claim 1, wherein the gyroscopic means measures movements in one, two or three dimensions.

3. A system according to claim 2, wherein there are at least two gyroscopic elements for each dimension to be measured.

4. A system according to claim 1, wherein the position control means measures and control movements of the stage and/or the probe or imaging apparatus.

5. A system according to claim 1, wherein there is at least one motor for moving the stage and/or the probe or imaging apparatus which is operatively connected with the position control means.

6. A system according to claim 1, wherein the control means measures tilt and/or rotational movements of the stage and/or the probe or imaging apparatus.

7. A system for inspecting and/or processing a sample on a stage, comprising:

a probe or imaging apparatus defined by an optical column having beam generating means, means to deflect the beam and image processing means; and position control means for controlling a position of the stage relatively to the probe or imaging apparatus;

wherein the position control means comprises gyroscopic means fixed to the stage and/or the probe or imaging apparatus and is operatively connected with the image processing means in which the unintentional movements of the stage relatively to the column will be taken into account when processing the image.

* * * * *